United States Patent

Tsai

[11] Patent Number: 5,998,973
[45] Date of Patent: Dec. 7, 1999

[54] METHOD AND DEVICE FOR AUTOMATICALLY SWITCHING AND ADJUSTING THE LOAD OF A BATTERY DISCHARGER

[76] Inventor: Hung-Li Tsai, No. 37, Yu-Liao Rd., Shang-Shan Tsun, Ta-Cheng Hsiang, Changhwa Hsien, Taiwan

[21] Appl. No.: 09/226,302

[22] Filed: Jan. 7, 1999

[30] Foreign Application Priority Data

Mar. 20, 1998 [TW] Taiwan .................................. 87104171

[51] Int. Cl.⁶ .......................... H01M 10/44; H01M 10/46
[52] U.S. Cl. ............................................ 320/135; 320/153
[58] Field of Search ..................................... 320/127, 129, 320/134, 136, 135, 150, 153, FOR 134, FOR 147

[56] References Cited

U.S. PATENT DOCUMENTS 5,661,643 8/1997 Blakely et al. ............................ 363/21
5,744,936 4/1998 Kawakami ............................... 320/120

Primary Examiner—Edward H. Tso
Attorney, Agent, or Firm—Holland & Hart LLP

[57] ABSTRACT

A method for automatically switching and adjusting the load of a battery discharger by using PTC (positive temperature coefficient) units and resistive heating elements as the load. The automatic switching and adjustment is accomplished by the steps of selecting the number of operating PTC units with constant power by the user; selecting the number of operating resistive heating elements based on the detected current changes; and automatically micro-adjusting the current of other resistive heating elements to obtain a discharge with a constant current. The present invention further provide a device for implementing the method for automatically switching and adjusting the load of a battery discharger.

9 Claims, 6 Drawing Sheets

METHOD AND DEVICE FOR AUTOMATICALLY SWITCHING AND ADJUSTING THE LOAD OF A BATTERY DISCHARGER

FIELD OF THE INVENTION

The present invention relates to a method for automatically switching and adjusting the load of a battery discharger, and more particularly to a method for automatically switching and adjusting the load of a battery discharger, by using PTC (positive temperature coefficient) units and resistive heating elements as the load.

RELATIVE DESCRIPTION OF PRIOR ART

A battery discharger is a device for discharging a battery or battery pack, thereby to determine the electrical property of the battery based on the result calculated in discharge for the purpose of acceptance or rejection. A conventional battery discharger (80) illustrated in FIG. 4 is generally constructed with a plurality of resistive heater elements (81) connected in parallel as the load. When a battery is electrically connected to the discharger (80), electrical energy stored in the battery will be transformed into heat energy by the resistive heater elements (81). However, during the discharge process, not all the resistive heater elements (81) are operated simultaneously as the battery voltage gradually decreases with the current discharge. A discharger circuit diagram is shown in FIG. 5. In this example, there are five resistive heater elements (81) used in the discharger (80) with each resistive heater element (81) being connected to a blade switch (82). Assuming that the initial discharge current is 200 A and the current ratings of the first through the fifth resistive heater elements are 200 A, 100 A, 50 A, 25 A and 10 A, respectively, only the first resistive heater element rated at 200 A is switched on at the beginning of discharge process. As the battery discharges, voltage across the battery decreases. To maintain the discharge rate, it is necessary to switch on additional resistive heating elements (81) as the battery discharges.

The conventional battery discharger has a relatively simple structure but has several disadvantages regarding construction and operation. A significant disadvantage is the huge volume of the discharger device that results from the large-sized blade switches required by high current rating of the resistive heating elements. A commonly-seen battery discharger with this construction has to be configured as large as a desk, so obviously, it is very inconvenient to move the discharger device to different battery or battery pack locations. A second problem is that resistive heating elements (81) acting as the load of discharger generate a great deal of heat. Consequently, the high temperature of the resistive heating elements may become a hazard to the operator since there is no special provision for heat dissipation except to leave the housing of the discharger open. that the load switching operation in a conventional discharger is performed manually, therefore working efficiency is less than satisfactory.

Although some manufacturers install a fan on the conventional battery discharger to move the heat away from the resistive heating elements, the other problems still exist.

Another improvement of the conventional device is to replace the resistive heating elements with PTC units (positive temperature coefficient heater), which have a relatively small volume and a large surface area for heat dissipation. By using PTC units, the volume of the whole device and potential danger to the operator can be greatly reduced. However, PTC units, as the load, actually are not well suited to be switched frequently to meet the discharge requirement as their current property is limited. FIG. 6 shows a characteristic curve of the PTC unit. A current surge occurs at the beginning seconds of discharge. This may cause fluctuation of discharge current, thereby affect stability and safety of operation of the discharger.

It is an aim of the present invention to obviate the above-mentioned problems and to provide a battery discharger which has relatively small volume, reliable safety and good working efficiency.

SUMMARY OF INVENTION

In accordance with one aspect of the present invention, a method for automatically switching and adjusting the load of battery discharger comprises the steps of setting the discharge conditions in which the discharge current, discharge voltage, discharge time and end voltage are to be set; of setting the main load (stationary load) in which the number of constant power PTC units to be operated is determined based on the values set in the previous step; setting the switched load in which the number of resistive heating elements to be activated is selected by detecting the current changes; micro-adjusting the load current in which the operating current of a plurality of additional resistive heating elements is automatically micro-adjusted by a PWM to complement the difference between the set current and the actual current, thereby achieving a discharge with constant discharge current; detecting the number of elements to be used in which the number of resistive heating elements to be switched is determined based on the pulse changes of the PWM; and switching the load in which the number of resistive heating elements which acting as a switched load is adjusted based on the results of the detecting step.

In accordance with another aspect of the present invention, a device for automatically switching and adjusting the load of battery discharger comprises a processing unit for determining an appropriate number of PTC units to be operated based on the set conditions and determining an appropriate number of resistive heating elements to be switched based on the detected actual current; a PWM unit for activating the appropriate number of additional resistive heating elements based on the current changes and micro-adjusting the operating current of the additional resistive heating elements to meet the requirement for discharge current; and a detecting unit for detecting the pulse width of a PWM unit, thereby instructing switching of the resistive heating elements.

In accordance with a further aspect of the present invention, the processing unit and PWM unit of the system are respectively connected to an I/O unit in order to control the operation of PTC units and resistive heating elements by using an electrical switch circuit. The electrical switch circuit is configured to use MOS-FET (metal oxide semiconductor field effect transistor) as a switch element thereof.

DETAIL DESCRIPTION OF THE PREFERRED EMBODIMENT

Figure 1:
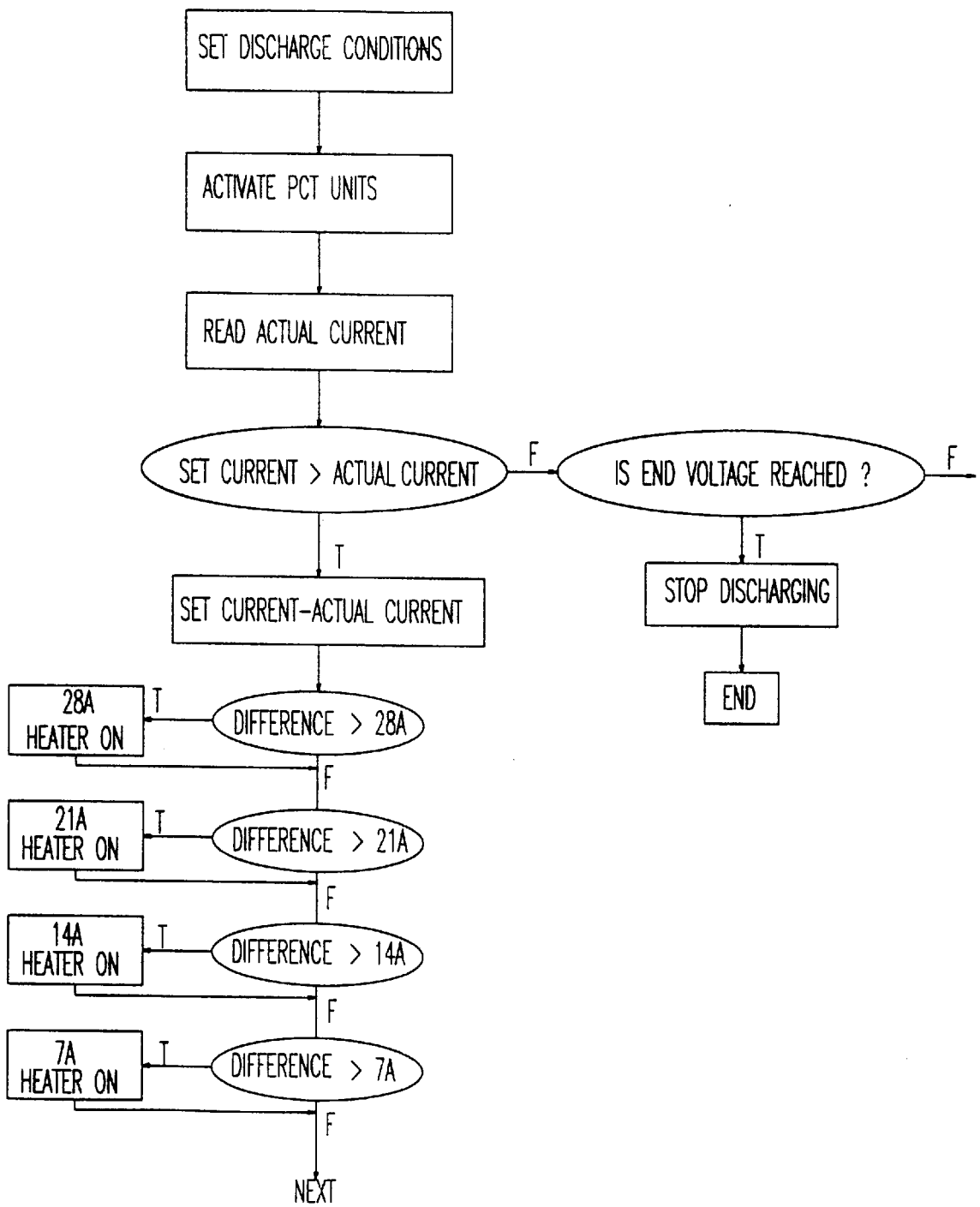
FIG. 1 is a flow chart showing the operation of the battery discharger in accordance with the present invention.

In accordance with the present invention, the battery discharger comprises a plurality of PTC (positive temperature coefficient heater) units and a plurality of resistive heating elements used as its load, wherein the rated current of the plurality of PTC units is constant and a large proportion of the overall load, and the plurality of resistive heating elements is a small proportion of the overall load. For instance, if the rated power of overall load is 14 KW, the part of PTC units shall be 10 KW and the resistive heating elements shall be 4 KW. The PTC units, acting as a stationary load, are activated one by one at the beginning of discharge process. The plurality of resistive heating elements are divided into two parts. The first part of the resistive heating elements acts as switched load which is selectively switched to co-operate with the stationary load. The second part of the resistive heating elements is controlled by a Pulse Width Modulator (PWM), thereby allowing the operating current to be automatically micro-adjusted to meet the requirement for discharge current.

The switching and adjustment of the load of the battery discharger is accomplished by setting discharge conditions, wherein the discharge current, discharge voltage, discharge time and end voltage are set; setting the main load (stationary load), wherein the number of constant power PTC units to be operated is determined based on the values previously set; setting the switched load, wherein the number of resistive heating elements to be activated is selected by detecting the current change; micro-adjusting load current, wherein the operating current of the second part of the resistive heating elements is automatically micro-adjusted by the PWM to complement the difference between the set current and the actual current, thereby achieving a discharge with constant discharge current; determining the number of resistive heating elements to be switched based on the pulse changes of the PWM; and switching on the load, wherein the number of resistive heating elements which act as the switched load to be adjusted is based on the number previously determined.

When discharge conditions, the current, voltage, time and end voltage of discharge are set by a user based on the specifications and properties of the battery. With the initial conditions set, the discharger device can automatically discharge the battery and automatically switch and adjust the load during discharging.

To set the main load, an appropriate number of PTC units is determined and switched on in turn.

To set the switched load, the number of resistive heating units is selected based on the detected current and then switched on to complement the difference between the set current and the total current of the PTC units.

To micro-adjust the load current, the operating current of the second part of the resistive heating elements is controlled and automatically micro-adjusted by means of the PWM changing the pulse width in order to complement the difference between the set current and the actual current, i.e., the total current of the PTC units and the switched resistive heating elements, thereby keeping the discharge current at a constant value.

In the step of detecting, the pulse width of the PWM is determined to be either high or low respectively. When the pulse width of the PWM is low, unnecessary resistive heating elements will be switched off to maintain the constant discharge current. When the pulse width of PWM is high, some unused resistive heating elements will be switched on based on the number required.

Figure 2:
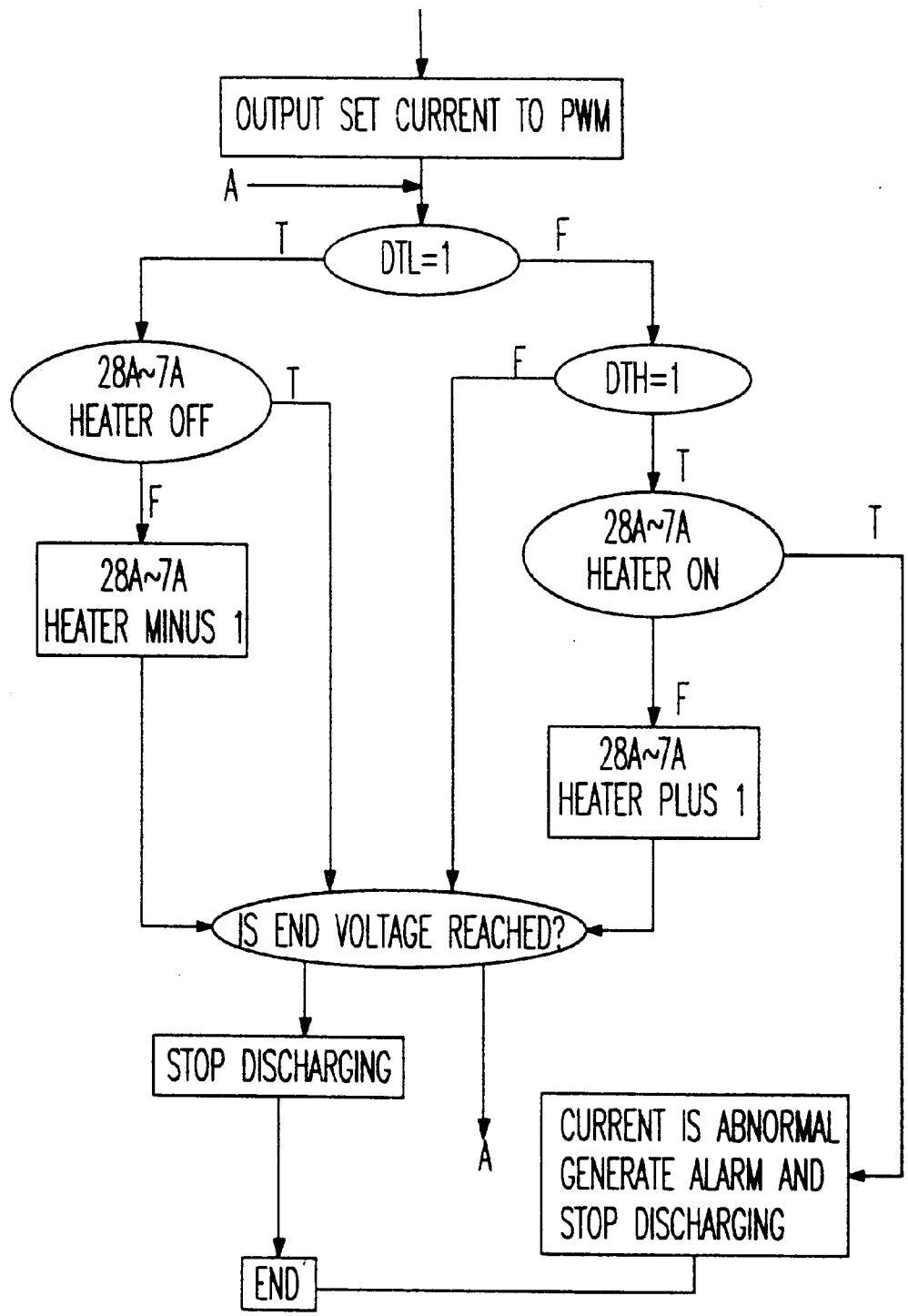
FIG. 2 is another flow chart showing the operation of the battery discharger of FIG. 1.

To facilitate understanding the operation of the battery discharger in accordance with the present invention, the detailed description refers to FIG. 1 and FIG. 2 with set values for the purpose of illustration only.

For illustration purposes only, the main load of the discharger comprises five PTC units, each having a constant capacity of 2 KW. When the voltage is 50 volts, each PTC unit has a current of 40 A. If the end voltage is 40 volts, current through each PTC unit increases to 50 A. Again for illustration purposes only, the discharger is considered to have four resistive heating elements as a switched load, whose rated current are respectively configured to be 28 A, 21 A, 14 A, and 7 A. A plurality of additional resistive heating elements are controlled by way of PWM in a manner as mentioned above. If the discharge current is set to 200 A when setting the initial conditions, the number of PTC units to be operated is 4, calculated by dividing 200 A by 50 A. Therefore, four PTC units are to be activated. If the voltage across the battery is 50 volts, the voltage drop across each PTC unit connected in parallel with the battery is also 50 volts, and the total current of the four PTC currents will be 160 A.

After the four PTC units are switched on one by one, a current sensor is used to detect the actual current of the load. If the set discharge current is larger than the actual current, then determine whether or not the discharging system reaches the end voltage, otherwise, to respectively determine whether the difference between the set discharge current and the actual current is larger than 28 A, 21 A, 14 A and 7 A. In this case, the total current of the four PTC currents is calculated to be 160 A. As a result, the resistive heating elements of 28 A and 7 A will be switched on to set the switched load as the difference between the set discharge current and the actual current is 40 A. In this way, the overall load becomes 160 A+28 A+7 A equal to 195 A.

Next, the set discharge current will be sent to the PWM (referring to FIG. 2). To micro-adjust the load current, the PWM is activated to micro-adjust the operating current of the additional resistive heating elements to complement 5 A to keep the actual current to be equal to the set discharge current of 200 A. In the way, the discharging can be performed under a constant current.

Figure 6:
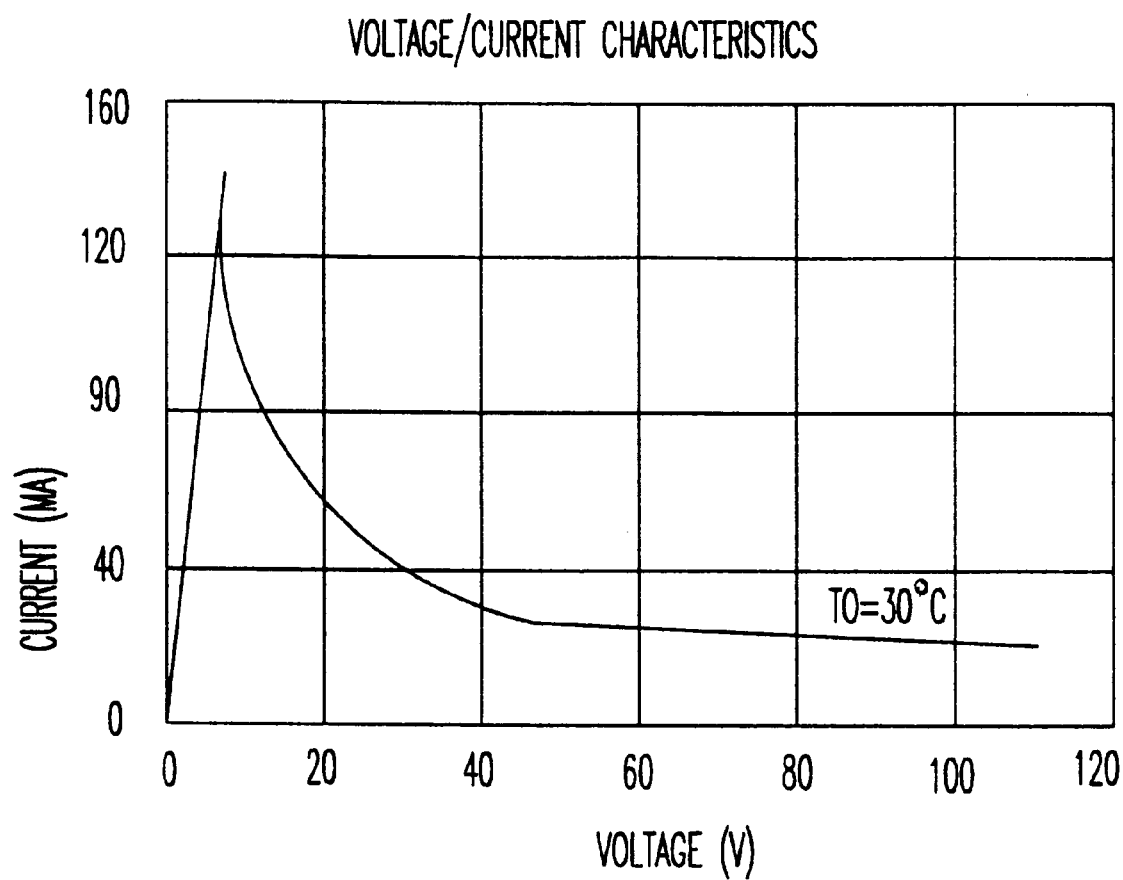
FIG. 6 is a current versus voltage characteristic curve of a PTC unit.

As the battery voltage gradually decreases during discharging, the current through each PTC unit will increase due to its constant capacity property, as shown in FIG. 6. To keep the discharge current constant, the step of micro-adjusting load current need to be done repeatedly. At the beginning, the PWM will slightly reduce the operating current of the additional resistive heating elements by changing the pulse width.

In the same time of micro-adjustment, the detecting step is performed to detect a maximal amplitude DTH and a minimal amplitude DTL of the pulse width. When the pulse width of PWM reaches the minimal amplitude (DTL=1), determine whether the four resistive heating elements are all not in use. If not, switch off the resistive heating element of 7 A and then determine whether the voltage of battery reaches the end voltage. If not, the step of micro-adjusting the load current needs to be repeatedly operated to keep the complement to the discharger current.

With the increasing of current of PTC units and the pulse width of PWM again lower than a certain level, the resistive heating element with the 28 A rating will be switched off and meanwhile, the resistive heating element with the 21 A rating will be switched on to reduce the total current of switched load. The difference between the set discharge current and the actual current will be complemented by the PWM micro-adjusting the additional resistive heating elements. In this way, the discharge current can be constantly kept at 200 A.

In the step of detecting, if the pulse width is detected to reach the maximal amplitude (DTH=1), determine whether the four resistive heating elements are all in use. If not, switch on the resistive heating element with the 7 A rating and then determine whether the battery voltage reaches the end voltage. If not, the step of micro-adjusting load current needs to be repeatedly performed to adjust the complementation to the discharger current.

Figure 3:
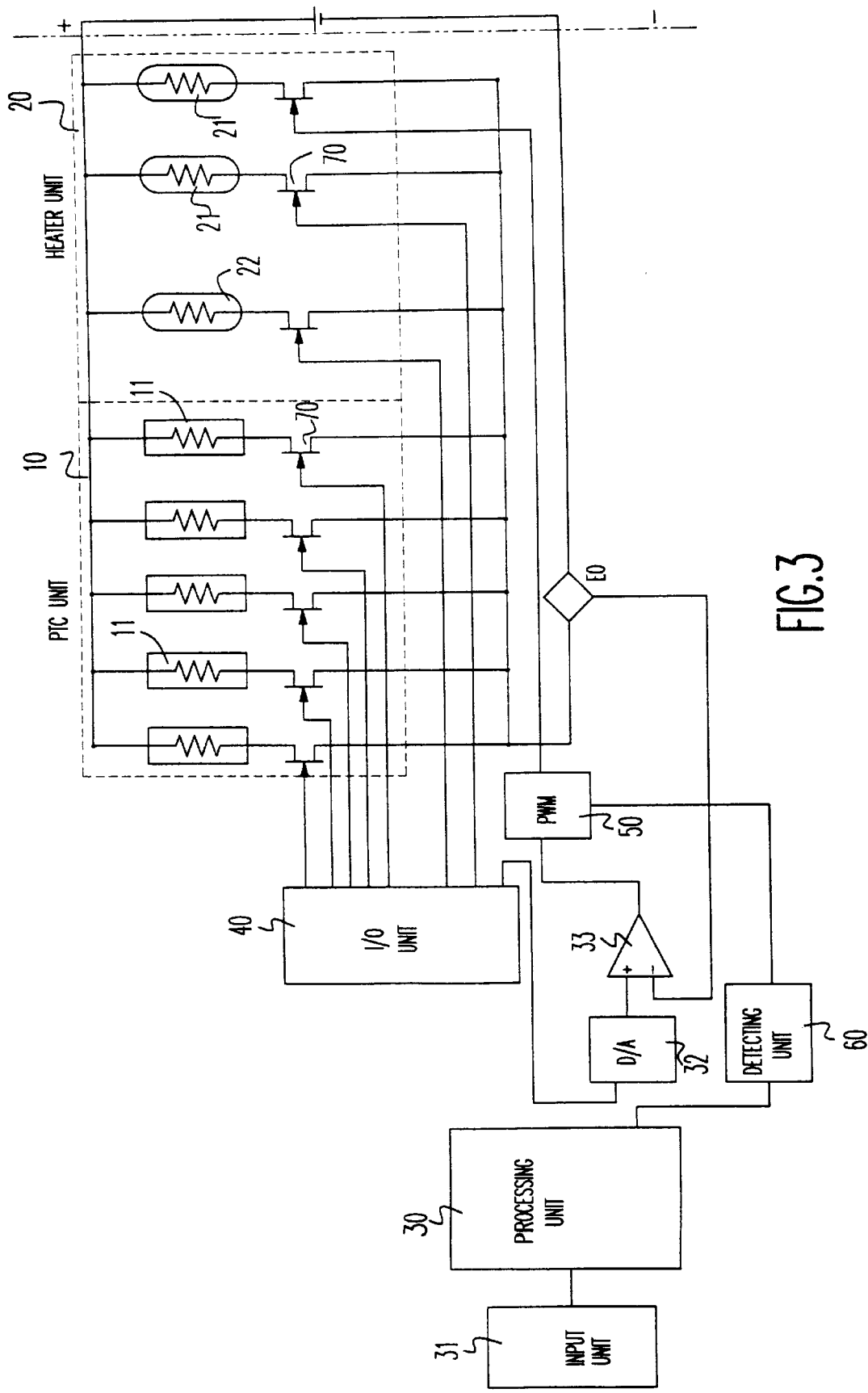
FIG. 3 is a schematic diagram of the battery discharger in accordance with the present invention.
Figure 4:
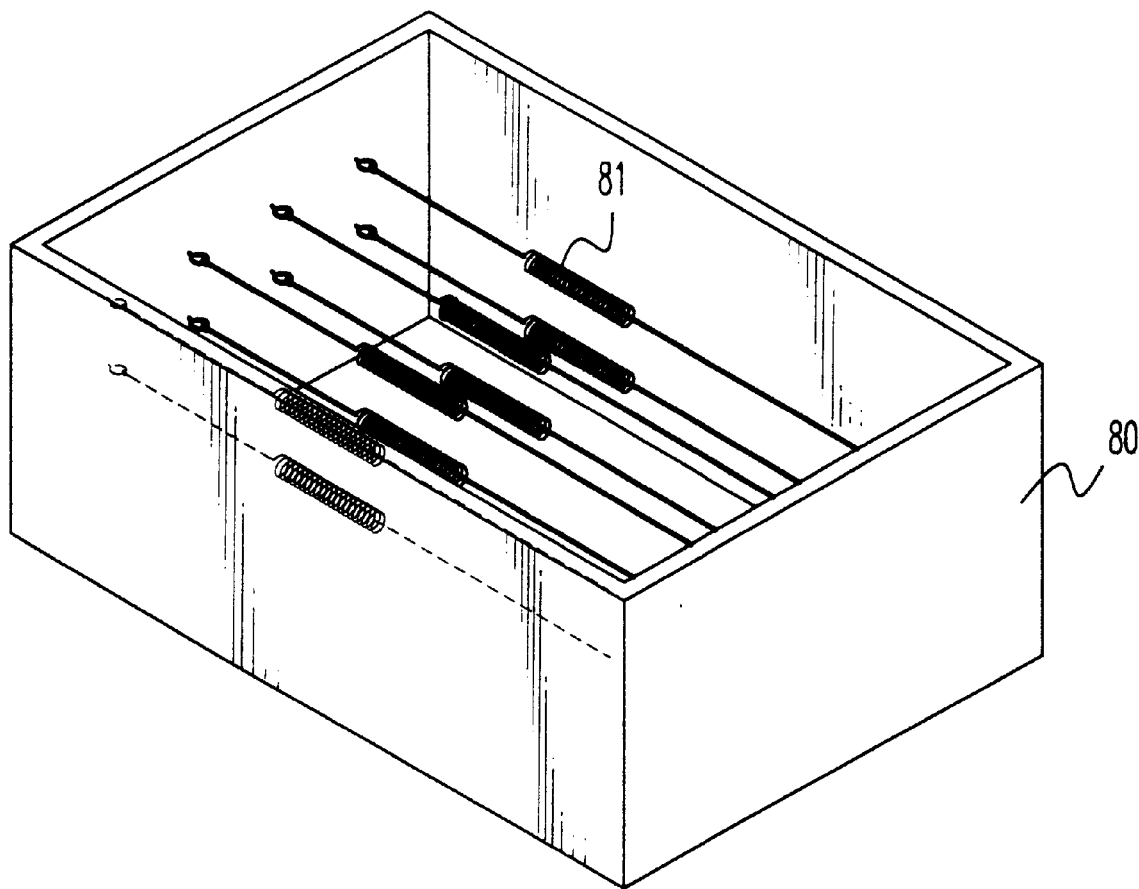
FIG. 4 is a perspective view of a conventional battery discharger.
Figure 5:
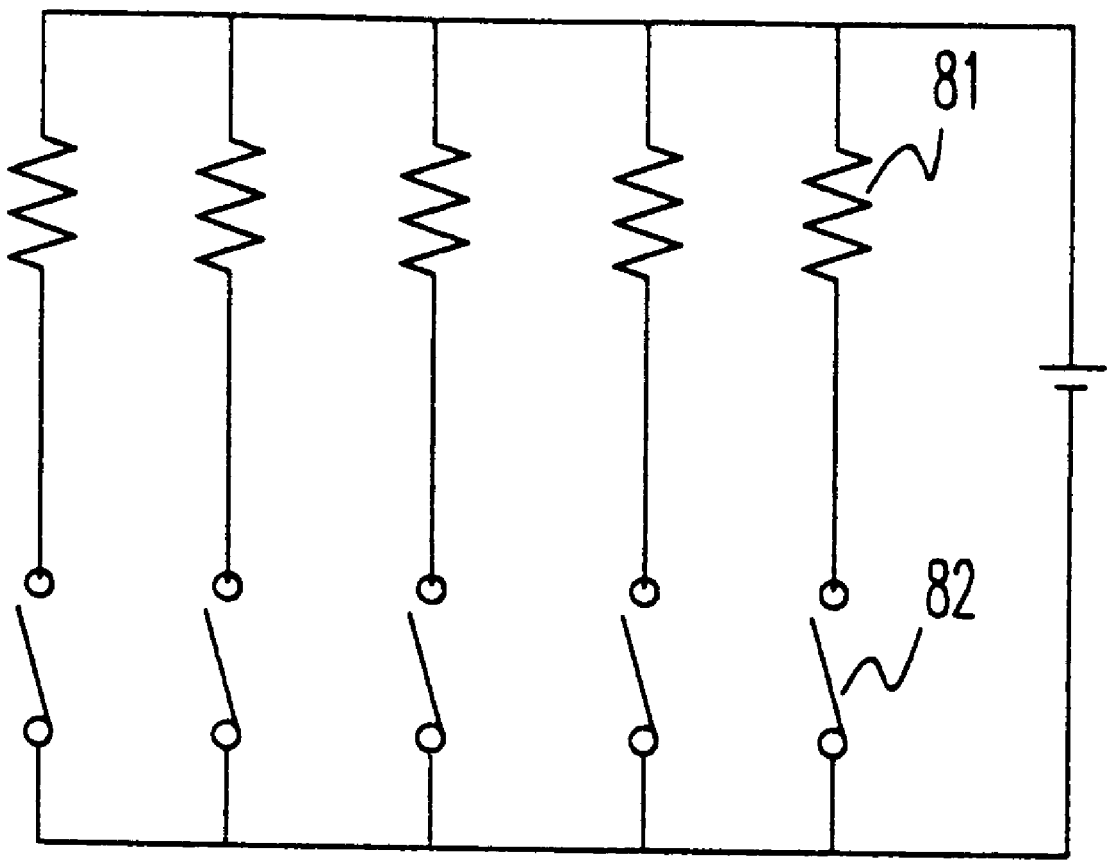
FIG. 5 is a circuit diagram of the conventional battery discharger of FIG. 4.

The method of switching and micro-adjusting the load of battery discharger should be apparent from the above description. The described steps are executed by a device as shown in FIG. 3. The device generally comprises a processing unit (30), a PWM unit (50) and a detecting unit (60).

The processing unit (30) has an input unit (31) connected to the input end thereof. The input unit (30) is typically a keyboard for a user to input and set discharge conditions, such as current, voltage and time of discharge. The processing unit (30) further is optionally connected with a display and a printer via a proper interface. The display is provided for displaying the discharge current, discharge voltage, discharge time and capacity. The printer is used for printing lists synchronized with the discharging. Furthermore, the processing unit (30) has a plurality of output ports respectively connected with each PTC units (11) of the main load (10) and a part of the resistive heating elements (21) of the switched load, through an I/O unit (40) which is provided for activating the main load (10) according to the set conditions and for switching on/off the required resistive heating elements (21) of switched load (20) based on the result detected by the detecting unit (60), thereby achieving automatic switching.

The I/O unit (40) is used as an interface both between the processing unit (30) and the PWM unit (50) and between the PWM unit (50) and the additional resistive heating elements (22).

The I/O unit (40) has a first number of output ends connected with each PTC unit (11) of the main load (10) via an electrical switch circuit (70) and a second number of output ends connected with a part of the resistive heating elements (21) of the switched load (20) via the electrical switch circuit (70). An output end of the PWM unit (50) is connected to the additional resistive heating elements (22) via the I/O unit (40) and the electrical switch circuit (70).

When the processing unit (30) outputs load control signals based on the set discharge current, the I/O unit (40) will select and activate a number of PTC units (11) and resistive heating elements (21) correspondingly. To avoid an excessive current, each PTC unit (11) is activated in turn by the processing unit (30) every several seconds. After the PTC units (11) are switched on, the operating PTC units act as a part of the load with large current. Other resistive heating elements (21) and the additional resistive heating elements (22) are selectively arranged to act as the remainder of required load, thereby keeping the discharge current at a constant value.

As mentioned above, with the decreased of battery voltage during discharging, the current through each PTC unit (11) will increase. To maintain a constant discharge current, the PWM unit (50) is micro-adjusts the operating current of the additional resistive heating elements (22) by changing the pulse width. However, when the current of PTC units (11) increases to a certain level, the PWM unit (50) will be unable to reduce the current of the additional resistive heating elements (22). At this time, the detecting unit (60) detects this information through the PWM unit (50) and instructs the processing unit (30) to switch off certain resistive heating elements (21) with large current. Meanwhile, the PWM unit (50) will automatically micro-adjust the additional resistive heating elements (22). By repeating this process, discharge current of the battery discharge can be maintained at a constant level.

Additionally, the device has a digital to analog converter (D/A converter) circuit (32) and a comparison circuit (33) sequentially connected between the PWM unit (50) and the I/O unit (40). A first input end of the comparison circuit (33) is connected to an output end of the processing unit (30) via the D/A converter (32) and the I/O unit (40). A second input end of the comparison circuit (33) is connected to the cathode of the battery via the current sensor (EO) in order to receive the current detecting signal.

The detecting unit (60) comprises a high level comparator and a low level comparator (not shown). The high level and low level comparators are respectively connected to the PWM unit (50) to correspondingly determine whether the pulse width reaches the maximal amplitude and minimal amplitude. Both output ends of the high level and low level comparators are respectively connected to the processing unit (30) to provide a reference for the processing unit (30) for switching and adjusting the resistive heating elements (21).

When the pulse width of the PWM unit (50) becomes lower than a certain level, the low level comparator of the detecting unit (60) will detect this information and send it back to the processing unit (30), thereby switching off an unnecessary resistive heating element (21). Then the difference between the set discharge current and the actual current is complemented by means of the PWM unit (50) micro-adjusting the additional resistive heating elements (22).

Otherwise, when the pulse width of the PWM unit (50) becomes higher than a certain level, the high level comparator of the detecting unit (60) will detect this information and send it back to the processing unit (30), thereby switching on a resistive heating element (21). Then the difference between the set discharge current and the actual current is complemented by means of PWM unit (50) micro-adjusting the additional resistive heating elements (22).

Furthermore, the battery discharger has a plurality of fans (not shown) corresponding to each PTC unit (11) of the main load (10) and each resistive heating element (21) of the switched load (20) for the purpose of heat dissipation, thereby reducing the temperature of the PTC units (11) and the resistive heating elements (21).

The electrical switch circuit (70) of the present invention uses MOS-FET (metal oxide semi-conductor field effect transistor) as its switch element. Additionally, the PTC unit per se is characterized by small volume and weight. Therefore, these arrangements allow the whole volume of the discharger device to be greatly reduced.

It also could be found that PTC unit essentially has a good efficiency of heat dissipation. Although several resistive heating elements are used in the discharger device, adequate operational safety can be assured by the arrangement of the fans.

To avoid fluctuation of current at the beginning of discharge as described in the preamble, the present invention utilizes PTC units as a stationary load and resistive heating elements as a switched load, thereby stability of operation of the discharger device can be attained.

It will therefore be readily understood by those persons skilled in the art that the above examples and embodiments are exemplary only, the invention being defined solely by the attached claims.

What is claimed is:

1. A method for automatically switching and adjusting the load of a battery discharger, comprising:
    a step of setting the discharge conditions in which the discharge current, discharge voltage, discharge time and end voltage are set;
    a step of setting the main load (stationary load) in which the number of constant power PTC units to be operated is determined based on the values set in the previous step;
    a step of setting the switched load in which the number of resistive heating elements to be activated is selected by detecting the current changes;
    a step of micro-adjusting the load current in which the operating current of a plurality of additional resistive heating elements is automatically micro-adjusted by way of a PWM to complement the difference between the set current and the actual current, thereby achieving a discharge with constant discharge current;
    a step of detecting in which whether the number of resistive heating elements to be switched is determined based on the pulse changes of the PWM; and
    a step of switching the load in which the number of resistive heating elements which act as the switched load is adjusted based on the results of the detecting step.

2. The method for automatically switching and adjusting the load of a battery discharger as claimed in claim 1, wherein in said step of setting the main load, a plurality of PTC units is used as a stationary main load which is a large proportion of the overall load.

3. The method for automatically switching and adjusting the load of a battery discharger as claimed in claim 1, wherein in said step of setting switched load, a plurality of resistive heating elements is used as a switched load which is a small proportion of the overall load, the number of said resistive heating elements to be switched being determined based on the detected actual current after the plurality of PTC units are activated.

4. The method for automatically switching and adjusting the load of a battery discharger as claimed in claim 1, wherein in said step of micro-adjusting load current, the operating current of the plurality of additional resistive heating elements is controlled and automatically micro-adjusted by means of the PWM changing the pulse width in order to complement the difference between the set current and the actural current, i.e., the total current of the PTC units and the switched resistive heating elements, thereby keeping the discharge current at a constant value.

5. The method for automatically switching and adjusting the load of a battery discharger as claimed in claim 1, wherein in said step of detecting, a high level comparator and a low level comparators are respectively used to determine whether the pulse width of the PWM reaches the maximal amplitude and the minimal amplitude and instruct switching operation of the switched load.

6. The method for automatically switching and adjusting the load of a battery discharger as claimed in claim 5, wherein in said step of switching the load, the unnecessary resistive heating elements will be switched off when the pulse width of the PWM is low, and the required resistive heating elements shall be switched on when the pulse width of the PWM is high, thereby maintaining a constant discharge current.

7. A device for automatically switching and adjusting the load of a battery discharger, comprising:
    a processing unit for determining an appropriate number of PTC units to be operated based on the conditions set and determining an appropriate number of resistive heating elements to be switched based on the detected actual current;
    a PWM unit for activating an appropriate number of additional resistive heating elements based on the current changes and micro-adjusting the operating current of the additional resistive heating elements to meet the requirement for discharge current; and
    a detecting unit for detecting the pulse width of a PWM unit, thereby instructing switching of the resistive heating elements.

8. The device for automatically switching and adjusting the load of a battery discharger as claimed in claim 7, wherein said processing unit and PWM unit are respectively connected to an I/O unit in order to control the operation of PTC units and resistive heating elements by using an electrical switch circuit.

9. The device for automatically switching and adjusting the load of battery discharger as claimed in claim 8, wherein said electrical switch circuit is configured to use MOS-FET (metal oxide semi-conductor field effect transistor) as a switch element thereof.

* * * * *